United States Patent
Miyamoto et al.

(10) Patent No.: US 6,599,352 B1
(45) Date of Patent: *Jul. 29, 2003

(54) WATER-BASED INK COMPOSITION FOR WRITING INSTRUMENT

(75) Inventors: Masaru Miyamoto, Yokohama (JP); Katsuhiko Shiraishi, Yokohama (JP); Yoji Takeuchi, Yokohama (JP); Tadashi Kamagata, Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/831,806

(22) PCT Filed: Nov. 12, 1999

(86) PCT No.: PCT/JP99/06342

§ 371 (c)(1), (2), (4) Date: May 10, 2001

(87) PCT Pub. No.: WO00/29494

PCT Pub. Date: May 25, 2000

(30) Foreign Application Priority Data

Nov. 13, 1998 (JP) .......................................... 10-324065

(51) Int. Cl.$^7$ ................................................ C09D 11/00
(52) U.S. Cl. ................................. 106/31.36; 106/31.68
(58) Field of Search ............................ 106/31.36, 31.68

(56) References Cited

U.S. PATENT DOCUMENTS 6,261,351 B1 * 7/2001 Miyamoto et al. ....... 106/31.36
6,264,729 B1 * 7/2001 Miyamoto et al. ....... 106/31.36

FOREIGN PATENT DOCUMENTS

| EP | 0997509 | 3/2000 | ............ C09D/11/16 |
| JP | 4-76074 | 3/1992 | ............ C09D/11/16 |
| JP | 8-12916 | 1/1996 | ............ C09D/11/18 |
| JP | 9-316378 | 12/1997 | ............ C09D/11/00 |
| WO | WO 99/02617 | 1/1999 | |
| WO | WO 99/28398 | 6/1999 | |

OTHER PUBLICATIONS

European Search Report for Application No. EP99972239, dated Oct. 28, 2002.

* cited by examiner

Primary Examiner—Mark L. Bell
Assistant Examiner—Veronica F. Faison
(74) Attorney, Agent, or Firm—Darby & Darby

(57) ABSTRACT

A water based ink composition for a writing instrument comprising at least a colorant, water and a liquid medium, wherein reduced maltooligosaccharide and/or reduced isomaltooligosaccharide are added in a proportion of 0.5 to 20% by weight based on the total amount of the ink composition.

2 Claims, No Drawings

WATER-BASED INK COMPOSITION FOR WRITING INSTRUMENT

TECHNICAL FIELD

The present invention relates to a water based ink composition used for a writing instrument, more specifically to a water based ink composition for a writing instrument which is excellent in the prevention of clogging at a pen tip and drought resistance.

BACKGROUND ART

There has so far been involved the problem that in the case of a water based ink, if water contained therein is evaporated, dissolved substances and admixed substances contained in the ink are concentrated, deposited, dried and solidified at the point of the writing instrument to cause clogging and a rise in the viscosity of the ink so that troubles in writing are brought about.

Accordingly, it has so far been proposed to add a slightly volatile dye-solubilizing agent or dye-solubilizing auxiliary, such as urea, thiourea, polyhydric alcohols or derivatives thereof, tetrahydrofurfuryl alcohol, 4-methoxy-4-methylpentane-2-one, ethylene oxide adducts of p-toluenesulfonamide and thiodiethanol, alkanolamine, and sorbitol.

However, the respective additives described above have not been able to provide satisfactory water based inks because they have the problems that they do not have the sufficient drought resistant effect and have toxicity and therefore are not suitable as additives and that they allow the viscosities of the inks to grow large to bring about inferior follow-up of the inks.

Starch decomposition products having reducing end groups, oligosaccharides such as maltooligosaccharide and dextrin and maltodextrin represented by glucose polymers are nonreduced sugars, and therefore blending them into an ink has provided the problem that while a drought resistant effect at a pen tip is recognized, a reaction (Maillard reaction) between them and amino groups in a pH controlling agent and a water soluble resin which are ink components goes on with the passage of time to bring about the trouble that a pH of the ink is lowered.

The present invention has been made in light of the conventional problems described above, and an object of the present invention is to provide a water based ink composition for a writing instrument which is excellent in drought resistance at a pen tip and is safe and which does not vary in a viscosity and a pH.

DISCLOSURE OF THE INVENTION

Intensive researches repeated by the present inventors in order to solve the problems described above have resulted in finding that the problems described above can be solved by adding reduced maltooligosaccharide and/or reduced isomaltooligosaccharide to a water based ink composition for a writing instrument, and thus the present invention has been completed.

That is, the water based ink composition for a writing instrument of the present invention is characterized by adding reduced maltooligosaccharide and/or reduced isomaltooligosaccharide to a water based ink composition for a writing instrument comprising at least a colorant, water and a liquid medium.

BEST MODE FOR CARRYING OUT THE INVENTION

The embodiment of the present invention shall be explained below in detail.

The reduced maltooligosaccharide and/or reduced isomaltooligosaccharide in the present invention are reduced products of maltooligosaccharide and/or isomaltooligosaccharide.

That is, the reduced maltooligosaccharide is a sugar alcohol of, for example, 2-saccharide to 10-saccharide obtained by reducing maltooligosaccharide.

Also, the reduced isomaltooligosaccharide is a sugar alcohol of, for example, 2-saccharide to 10-saccharide obtained by reducing isomaltooligosaccharide.

Those commercially available or those obtained by reducing maltooligosaccharide and/or isomaltooligosaccharide by a conventional method may be used for the reduced maltooligosaccharide and/or reduced isomaltooligosaccharide.

A content of reduced maltooligosaccharide and/or reduced isomaltooligosaccharide contained in the water based ink composition for a writing instrument shall not specifically be restricted and is suitably selected from a range of 0.5 to 20% by weight, preferably 1 to 10% by weight based on the total amount of the ink composition.

The content of less than 0.5% by weight decreases an effect on the drought resistance, and the content of more than 20% by weight increases the spinnability to lower the writing feeling.

Water used in the present invention is used as a principal solvent and includes ion-exchanged water and refined water.

The liquid medium used in the present invention includes, for example, water-soluble organic solvents. To be specific, it includes alcohols such as ethylene glycol, diethylene glycol, triethylene glycol, propylene glycol, dipropylene glycol, glycerin and 2-propanol, and 2-pyrrolidone. They may be used alone or in suitable combination of two or more kinds thereof.

A use amount of the liquid medium shall not specifically be restricted and is suitably selected from a range of 3 to 40% by weight, preferably 5 to 30% by weight based on the total amount of the water based ink composition for a writing instrument.

The colorant used in the present invention shall not specifically be restricted as long as it is usually used as a colorant, and all which can be dissolved or dispersed in the liquid medium described above can be used and include, for example, pigments and dyes.

The pigments include, for example, organic pigments such as phthalocyanine pigments, azo pigments, perinone and perylene pigments, anthraquinone pigments, quinacridone pigments, dye lakes, nitro pigments and nitroso pigments, and inorganic pigments such as carbon black, titanium black, zinc oxide, red iron oxide, chromium oxide, black iron oxide, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder and bronze powder.

The dyes include acid dyes such as Eosine, Phloxine, Water Yellow # 6-C, acid red, Water Blue # 105, Brilliant Blue FCF and Nigrosine NB, direct dyes such as Direct Black 154, Direct Sky Blue 5B and Violet BB, and basic dyes such as Rhodamine and Methyl Violet.

These colorants may be used alone or in suitable combination of two or more kinds thereof.

A use amount of the colorant shall not specifically be restricted and is suitably selected from a range of 1 to 40% by weight, preferably 3 to 20% by weight based on the total amount of the water based ink composition for a writing instrument.

When a pigment is used as the colorant, a dispersant is preferably used.

The dispersant includes water-soluble polymers or surfactants, and specific examples thereof include water-soluble polymers including anionic polymers such as polyacrylic acid salts, salts of styrene-acrylic acid copolymers, salts of styrene-maleic acid copolymers, salts of vinylnaphthalene-maleic acid copolymers and β-naphthalenesulfonic acid-formalin condensation products, and nonionic polymers such as polyvinylalcohol, polyvinylpyrrolidone and polyethylene glycol, anionic surfactants, nonionic surfactants and cationic surfactants. They may be used alone or in suitable combination of two or more kinds thereof.

A use amount of the dispersant is suitably selected from a range in which the properties of the water based ink composition for a writing instrument of the present invention are not damaged.

Further, components other than those described above may be added to the water based ink composition for a writing instrument of the present invention as long as the properties of the above water based ink composition are not damaged.

The components which can be added include, for example, fungicides such as sodium benzoate, Bioden-18, Amorden-HS, Amorden BT-50 and Amorden FS-14D (all manufactured by Daiwa Chemical Industries Co., Ltd.), Proxel BDN, Proxel GXL and Proxel TN (all manufactured by Zeneca Co., Ltd.), pH-controlling agents such as, for example, ammonia, aminomethylpropanol, triethanolamine, potassium hydroxide and potassium phosphate, viscosity-controlling agents such as, for example, polyacrylic acid salts and alginic acid salts, fatty acid alkali salts such as, for example, polyalkylene glycol derivatives, sodium oleate and potassium linoleate, lubricants such as nonionic surfactants and fluorine base surfactants, preservatives such as, for example, sodium omadine and 1,2-benzisothiazoline, rust preventives such as, for example, benzotriazole and saponin, defoaming agents and starving preventives.

The water based ink composition for a writing instrument of the present invention can easily be produced by dissolving, if necessary, with heating, mixing and stirring the components described above.

The water based ink composition for a writing instrument of the present invention is characterized by adding reduced maltooligosaccharide and/or reduced isomaltooligosaccharide to the above ink composition. The above reduced maltooligosaccharide and/or reduced isomaltooligosaccharide are non-toxic and safe saccharides which are usually used as an edible sweetening and are characterized by having a high solubility in water and very excellent water retention. Thus, the water based ink composition for a writing instrument of the present invention containing this reduced maltooligosaccharide and/or reduced isomaltooligosaccharide is safe and has been improved in drought resistance without causing the problem that the ink viscosity and the pH are vary with the passage of time.

Since the reduced maltooligosaccharide and/or reduced isomaltooligosaccharide do not exert an adverse effect on substances usually used for inks, they do not exert an adverse effect on the properties of the inks and do not change a hydrogen ion concentration in the inks, so that they do not exert an adverse effect as well on anionic and cationic substances. Accordingly, they have the advantage that a colorant can optionally be selected from all of water base dyes and organic or inorganic pigments.

EXAMPLES

The present invention shall be explained below in further details with reference to examples and comparative examples, but the present invention shall by no means be restricted by the examples.

Example 1

The respective components were blended in the following proportion to prepare a water based blue ink for a ballpoint pen:

| | |
|---|---|
| Phthalocyanine blue | 8.0% by weight |
| Styrene-acrylic acid resin ammonium salt | 3.0% by weight |
| Ethylene glycol | 20.0% by weight |
| Reduced maltooligosaccharide | 5.0% by weight |
| Phosphoric ester | 0.7% by weight |
| Bioden | 0.3% by weight |
| Aminomethylpropanol | 0.3% by weight |
| Benzotriazole | 0.2% by weight |
| Ion-exchanged water | balance |

Example 2

The respective components were blended in the following proportion to prepare a water based blue ink for a ballpoint pen:

| | |
|---|---|
| Phthalocyanine blue | 8.0% by weight |
| Styrene-acrylic acid resin ammonium salt | 3.0% by weight |
| Ethylene glycol | 20.0% by weight |
| Reduced isomaltooligosaccharide | 4.0% by weight |
| Phosphoric ester | 0.5% by weight |
| Bioden | 0.3% by weight |
| Aminomethylpropanol | 0.3% by weight |
| Benzotriazole | 0.2% by weight |
| Ion-exchanged water | balance |

Example 3

The respective components were blended in the following proportion to prepare a water based black ink for a ballpoint pen:

| | |
|---|---|
| Carbon black | 8.0% by weight |
| Styrene-maleic acid resin ammonium salt | 3.0% by weight |
| Reduced isomaltooligosaccharide | 3.0% by weight |
| Potash soap | 0.5% by weight |
| Propylene glycol | 20.0% by weight |
| Bioden | 0.3% by weight |
| Aminomethylpropanol | 0.3% by weight |
| Benzotriazole | 0.2% by weight |
| Cross-linking type acrylic acid polymer | 0.4% by weight |
| Ion-exchanged water | balance |

Example 4

The respective components were blended in the following proportion to prepare a water based black ink for a felt tip pen:

| | |
|---|---|
| Carbon black | 8.0% by weight |
| Styrene-maleic acid resin ammonium salt | 3.0% by weight |
| Reduced maltooligosaccharide | 3.0% by weight |
| Ethylene glycol | 20.0% by weight |
| Bioden | 0.3% by weight |
| Aminomethylpropanol | 0.3% by weight |
| Ion-exchanged water | balance |

Comparative Example 1

The same procedure as in Example 1 was repeated to prepare a water based blue ink for a ballpoint pen, except that reduced maltooligosaccharide was removed in Example 1.

Comparative Example 2

The same procedure as in Example 2 was repeated to prepare a water based blue ink for a ballpoint pen, except that 5.0% by weight of urea was substituted for 4.0% by weight of reduced isomaltooligosaccharide in Example 2.

Comparative Example 3

The same procedure as in Example 3 was repeated to prepare a water based black ink for a ballpoint pen, except that 3.0% by weight of non-reduced dextrin was substituted for 3.0% by weight of reduced isomaltooligosaccharide in Example 3.

Comparative Example 4

The same procedure as in Example 4 was repeated to prepare a water based black ink for a felt tip pen, except that reduced maltooligosaccharide was removed in Example 4.

Evaluation Test

Test 1: Evaluation Test of Inks for a Ballpoint Pen

Ballpoint pens having a ball diameter of 0.7 mm were charged respectively with the water based inks for a ballpoint pen prepared in Examples 1 to 3 and Comparative Examples 1 to 3 each described above and left standing with the caps detached, and the time passed until starving was caused was determined. Further, investigated were a changes in the viscosity at a shearing rate of 38.4 $s^{-1}$ and the pH at the time of preparing the inks versus after stored at 50° C. for one month. The results thereof are shown in Table 1.

TABLE 1

Evaluation test of water based inks for a ballpoint pen

| | Example | | | Comparative Example | | |
|---|---|---|---|---|---|---|
| | 1 | 2 | 3 | 1 | 2 | 3 |
| Color of ink | Blue | Blue | Black | Blue | Blue | Black |
| Time passed until starving | 30 days | 30 days | 15 days | 15 days | 20 days | 15 days |
| Ink initial viscosity mPa · s | 3.5 | 3.5 | 400 | 3.4 | 3.8 | 400 |

TABLE 1-continued

Evaluation test of water based inks for a ballpoint pen

| | Example | | | Comparative Example | | |
|---|---|---|---|---|---|---|
| | 1 | 2 | 3 | 1 | 2 | 3 |
| Viscosity change | None | None | None | None | Rise | None |
| pH change[1] | 0.1 | 0.1 | 0 | 0.1 | 0.1 | 0.7 |

[1]pH change: pH difference = (initial value) - (value after stored at 50° C./one month)

Comments on Table 1

As apparent from the results shown in Table 1, the water based blue inks for a ballpoint pen of the present invention obtained in Examples 1 and 2 and the water based blue inks for a ballpoint pen falling outside the scope of the present invention obtained in Comparative Examples 1 and 2 provided the equal results regarding a change in the pH's with the passage of time. However, the water based blue inks for a ballpoint pen obtained in Examples 1 and 2 had longer time passed until starving was caused and provided good results as compared with those of the water based blue inks for a ballpoint pen obtained in Comparative Examples 1 and 2.

Further, the water based black ink for a ballpoint pen of the present invention obtained in Example 3 and the water based black ink for a ballpoint pen falling outside the scope of the present invention obtained in Comparative Example 3 did not cause a change in the viscosities with the passage of time and provided the equal result regarding time passed until starving was caused. In the pH change, the water based black ink for a ballpoint pen obtained in Example 3 exhibited no change and provided good results as compared with those of the water based black ink for a ballpoint pen obtained in Comparative Example 3.

In view of the foregoings it can be found that the water based ink compositions for a writing instrument of the present invention are apparently excellent.

Test 2: Evaluation Test of Inks for a Felt Tip Pen

Commercial felt tip pens were charged with the water based inks for a felt tip pen prepared in Example 4 and Comparative Example 4 each described above and left standing with the caps detached, and the time passed until starving was caused was determined. Further, investigated was a change in the viscosity and the pH at the time of preparing the inks versus after stored at 50° C. for one month. The results thereof are shown in Table 2.

TABLE 2

Evaluation test of water based inks for a felt tip pen

| | Example 4 | Comparative Example 4 |
|---|---|---|
| Time passed until starving | 12 hours | 5 hours |
| Ink initial viscosity mPa · s | 3.2 | 3.0 |
| Viscosity change | None | None |
| pH change[1] | 0 | 0 |

[1]pH change: pH difference = (initial value) - (value after stored at 50° C./one month)

Comments on Table 2

As apparent from the results shown in Table 2, both of the ink for a felt tip pen of the present invention obtained in Example 4 and the ink for a felt tip pen falling outside the scope of the present invention obtained in Comparative Example 4 did not change in the viscosity and the pH with the passage of time. However, the ink for a felt tip pen of the present invention obtained in Example 4 had longer time passed until starving was caused and provided good results as compared with that of the ink for a felt tip pen obtained in Comparative Example 4.

It can be found as well from this fact that the water based ink compositions for a writing instrument of the present invention are apparently excellent.

As described above, the water based ink composition for a writing instrument of the present invention exerts remarkable effects due to containing reduced maltooligosaccharide and/or reduced isomaltooligosaccharide in that it is very safe and is improved very much in drought resistance without varying the ink viscosity and the pH with the passage of time.

INDUSTRIAL APPLICABILITY

The water based ink composition of the present invention has excellent drought resistance and is safe, and it does not cause a change in a viscosity and a pH and can be used for writing instruments such as ballpoint pens, marking pens and felt tip pens.

What is claimed is:

1. A water based ink composition for a writing instrument comprising at least a colorant, water and a liquid medium, wherein the ink composition comprises reduced maltooligosaccharide, and/or reduced isomaltooligosaccharide, and has a viscosity of 3.5 to 400 mPa·S at a shearing rate of 38.4 $S^{-1}$.

2. The water based ink composition for a writing instrument as described in claim 1, comprising 0.5 to 20% by weight of reduced maltooligosaccharide and/or reduced isomaltooligosaccharide based on the total amount of the ink composition.

* * * * *